Feb. 23, 1932.   P. O. SCOW   1,846,911
DISPLAY
Filed July 13, 1929
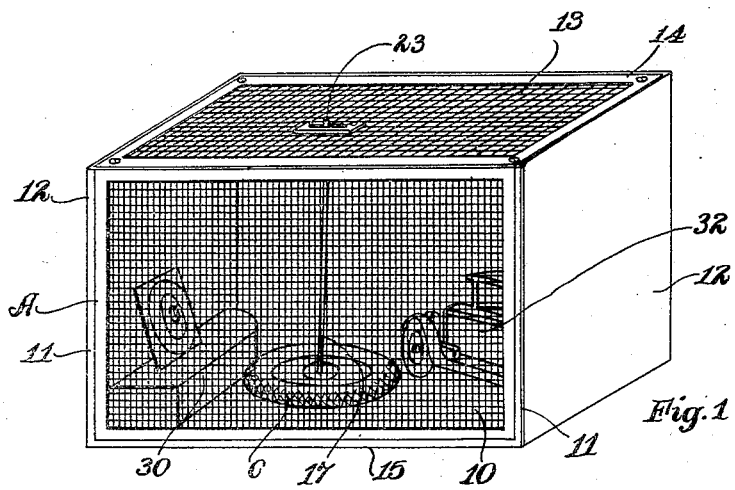
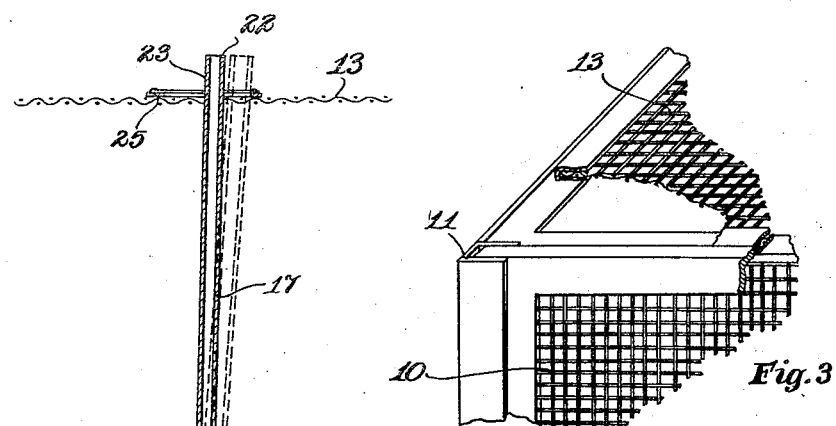
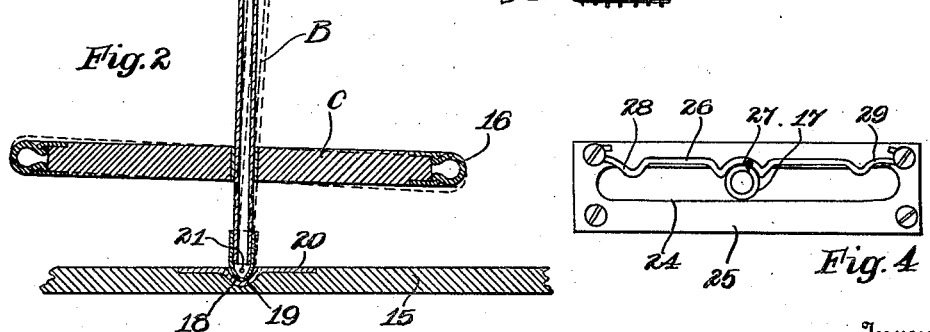
Inventor
Peter O. Scow
By Homan Piehler
Attorney Patented Feb. 23, 1932

1,846,911

UNITED STATES PATENT OFFICE

PETER O. SCOW, OF ST. PAUL, MINNESOTA

DISPLAY

Application filed July 13, 1929. Serial No. 378,051.

My invention relates to a display device and more particularly that type which may be operated by small animals such as trained mice or other small animals inclosed within a cage wherein the display is set up.

A feature of the invention resides in providing a rotatable member which is adjustable into different angular positions whereby the rotation of the same may be accomplished more readily when in the inclined position by the small animals jumping upon the wheel or disc-like display member which is positioned within the cage wherein the animals are kept.

My invention includes a display having means of easily oiling the shaft of the rotatable member, particularly the lower bearing of the same, so that it will operate for a long period of time with little or no attention and in a manner to permit it to run freely with little or no friction, thus permitting the rotatable display member to be easily operated even by small trained mice.

It is a feature of my invention to provide a display wherein several display members may be inclosed within a cage wherein the animals are confined and to associate with these various display members within the cage such members as will co-operate together to form a complete and attractive display.

These features together with other details of my invention will be more clearly and fully set forth in the specification and claims.

In the drawings forming part of this specification:

Figure 1 is a perspective view of my display.

Figure 2 is an enlarged detail cross section of a portion of my display.

Figure 3 is an enlarged detail of a portion of the cage of the display.

Figure 4 is an enlarged detail of a portion of the display.

My display A includes a cage wherein small animals may be confined, such as trained mice, squirrels or other animals so as to provide a display within the cage of the display A. The display A is formed with a wire mesh front 10 which is slidably held in the channel members 11 on either end of the front of the cage of the display, while the end members 12 may be closed.

The front 10 provides the open portion to the cage of my display A so that the display within the cage may be readily visible through the front 10. This mesh front 10 also provides the desired ventilation into the cage of the display A.

I also provide the top 13 of mesh of any suitable nature so that a sufficient amount of ventilation and air may be directed into the cage and the open or mesh top 13 serves to form visibility into the cage of the display A through the top as well as through the front. The back 14 of the display A may be of a closed nature as are the ends 12, and the bottom 15 is preferably closed so as to form a floor for the display.

The operating member B of my display A includes a turn-table C which may be provided with a miniature rubber tire 16 supported about the periphery of the same which also forms a round edge for the turn-table C and provides a display which may be used in the advertisement of tires or other articles of a similar nature. The operating member B is designed to be operated by small animals which form a part of the display such as mice which may be trained to operate the display A in a manner to form a very interesting attraction both for the activity of the animals confined within the display A and for the features of the display which tend to advertise the particular articles miniaturely displayed within the same.

The operating member B consists of a hollow shaft 17 which is formed with a bearing point 18 on one end which fits into the socket 19 in the plate 20 which is set in the floor 15. An oil opening 21 is formed through the bearing point 18 and as the shaft 17 is of a hollow nature oil may be directed into the upper open end 22 of the same so that in the rotation of the rotor or table C oil will be directed to the bearing point 18 and into the socket 19. Only the required amount of lubricant will be discharged out of the opening 21 into the socket 19, and thus the rotor C may be operated freely with a very small amount of friction. This will permit the mice to operate the rotor C to act as a turntable and cause it to turn around quite rapidly or in accordance with the effort of the animal running upon the upper surface of the member C.

The upper end 23 of the shaft 17 projects through the slot 24 in the plate member 25 which is secured to the top 13. This plate 25 is provided with a spring catch 26 extending along one side of the slot 24 and which is formed with the central notch 27 and end notches 28 and 29 which are positioned near the ends of the slot 24.

The operating member B may be shifted in such a manner so as to incline the rotor C either in one direction or the other by moving the upper free end 23 of the shaft 17 in one direction or the other from the center notch 27. When the shaft 17 is supported in the center notch 27 it is adapted to extend more perpendicularly from the bottom 15 or it may extend so as to hold the rotor table C nearly parallel with the bottom 15. If more of an angle of incline for the rotor C is desired then the free end 23 of the shaft 17 may be moved away from the central notch 27 of the plate member 25 carried by the top 13.

By slightly inclining the rotor table C and by placing within the display cage a shelf and hood member 30 the mice are inclined to jump upon the rotor C with the intention of running across the same so that they can jump upon the shelf 30 more readily. In the effort of the mice to run across the rotor C the same is caused to rotate very freely and thus the mice after they become trained will apparently run for some little time on the rotor C causing it to spin around in an attractive manner before the mice jump off on to the shelf 30 or jump off of the rotor C. The shelf 30 may form a platform upon which the animals may jump from the rotor C to rest and this being placed slightly higher than the top of the rotor C causes the animals to be inclined to run on the rotor C before jumping on to the shelf 30. This shelf also may constitute a hood-like member within the cage of the display A and being hollow beneath the same the animals may run underneath to hide away when they desire.

The display A may also contain other display matter such as a miniature automobile 32 and this together with the tire-like edge 16 of the rotor C provides a good advertising display for tires and thus an attractive display may be made up which will attract attention through the activity of the small animals within the same and thus advertise whatever product is displayed within the cage of the display A.

The adjustment of the operating member B so that the rotor table C may be inclined to cause the animals to operate the same more freely and to teach small animals to run around upon the rotor C is a feature of the invention including also the unique means of oiling the same by the hollow supporting shaft or standard such as 17. Thus by placing a few drops of oil within the hollow standard 17 the bearing point 18 may be properly oiled so that the friction is largely overcome and thus the rotor is adapted to operate freely. My display is very attractive and holds the attention of the observer so as to provide a unique utility for advertising purposes.

In accordance with the patent statutes I have described the principles of my display and while I have illustrated a particular combination of the elements and the formation of the parts, I desire to have it understood that the same is only suggestive of a means of carrying out my invention and that the same may be applied to other display matter and carried out by other variations within the scope of the following claims without departing from the spirit of the invention.

I claim:

1. A display including, a rotor having an adjustable hollow standard, a tapered and rounded bearing point formed on one end of said standard, and an oil hole extending out of the tapered portion of said bearing point into the socket adapted to support the same.

2. A display including, a cake-like casing having open mesh sides for displaying small animals therein, a rotor within said casing, a socket in the floor of said casing, a pointed standard pivoted within said socket, a rotor display table carried by said standard, an oil well formed in said standard for oiling the bearing point thereof and a hole formed in the pointed end of said standard through which said oil may drip.

3. A display for small animals including, a cage having display openings formed therein, a rotatable display member, spring means for adjustably supporting said display member into different inclined angular positions to cause a more or less freely rotatable display within said cage.

4. An advertising display comprising, a cage, advertising elements within said cage, some of which are rotatably supported within said cage in a manner to be adjusted to different inclined positions within the cage, notch means for holding the display members in set position freely rotatable, and means for oiling the bearing points of the same whereby the rotatable display members may be easily rotated by small animals running on the same.

5. An advertising display including, a cage for displaying small animals, rotatable display members within said cage, shafts on said display members extending through said cage and said extended shaft end providing means for adjusting the inclined position of said display members externally of said cage to cause the same to be more easily operated by small animals running on the same.

6. A display including, a cage for small animals, a series of display members positioned within said cage having a co-ordinating relation one with the other, a rotatable member forming one of the display elements within said cage, an oil well within said rotatable member, a shaft-like standard for said rotatable member, and means for adjusting and supporting into different positions the free end of said shaft-like member.

7. A display comprising, a cage, display members positioned within said cage, one of said display members including an upright standard, a rotatable disc-like member supported by said standard near the lower bearing end of the same, a bearing point formed on said standard, a socket for receiving said bearing point, an oil well within said standard, an opening through said point to said socket, and means for supporting the free end of said standard to permit the same to be set in different positions to change the incline of the rotatable member supported by said standard whereby small animals are caused to freely rotate said rotatable member and form a rotating display which is automatically oiled in the operation of the same.

PETER O. SCOW.